Oct. 29, 1946.  G. C. ABBOTT  2,410,037
ARTICLE REJECTING MECHANISM
Filed Feb. 2, 1945
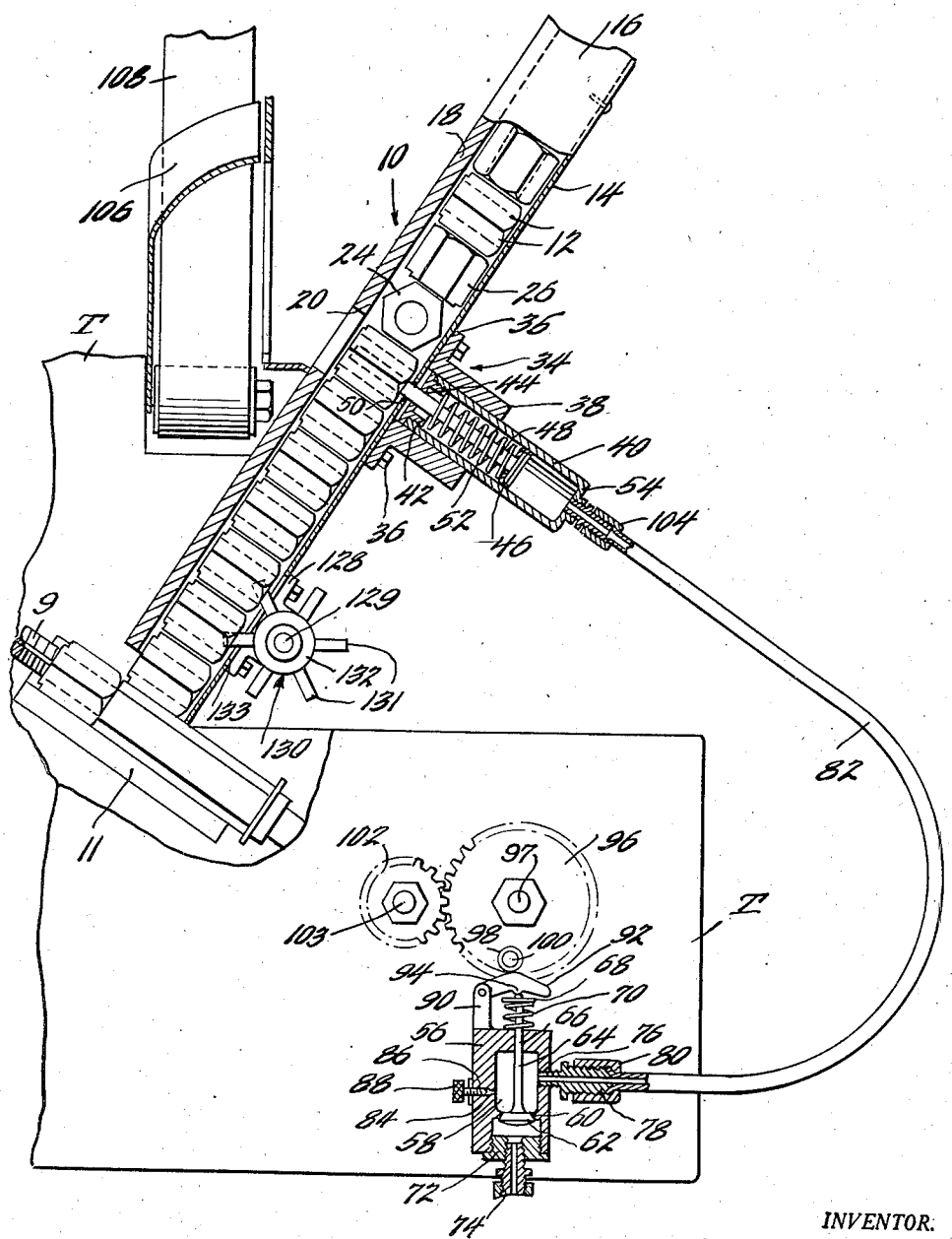
INVENTOR.
Gail C. Abbott,
BY
Strauch & Hoffman
ATTYS Patented Oct. 29, 1946

2,410,037

UNITED STATES PATENT OFFICE 2,410,037

ARTICLE REJECTING MECHANISM

Gail C. Abbott, South Whitley, Ind., assignor to Grip Nut Company, South Whitley, Ind., a corporation of Illinois Application February 2, 1945, Serial No. 575,871

9 Claims. (Cl. 10—162)

This invention relates to mechanism for rejecting nuts and like articles from a conveyor line thereof and is particularly adapted for use in connection with tapping machines and the like.

In nut tapping machines of the type currently in extensive use, the drilled nut bodies or blanks are successively fed to an automatic tapping mechanism and must discharge from the feed means in a predetermined manner in order to assume the proper position for tapping. Should the feeding means present a nut to the tapping mechanism in a position other than the predetermined proper position serious damage may result.

The feeding means commonly comprises a chute conveying the blanks from a source of supply to the tapping holder under the force of gravity. While the blanks are directed into the intake end of the chute with a view to predetermined positioning therein, due to the rapidity of feeding movement it quite frequently happens that blanks enter the chute in other than the proper position and may interrupt operation of or cause damage to the tapping machine.

The primary object of the present invention is to provide novel means for rejecting improperly positioned articles from an intermittently movable line of such articles.

Another object of the invention is to provide means whereby a multiplicity of improperly positioned articles may be rejected from a conveying line during conveying movement of such articles along said conveying line.

A further object of the invention is to provide novel means for rejecting improperly disposed nut blanks from a line of nut blanks conveyed for feeding to a tapping machine or the like.

A still further object of the invention is to provide rejecting mechanism wherein a multiplicity of improperly positioned nut blanks may be rejected from a feed line of nut blanks during the interval between successive feeding movements of the blanks to a tapper.

Still another object of the invention is to provide an article rejecting mechanism which is capable of operation with such rapidity that a relatively large number of successively improperly positioned blanks may be rejected without interrupting the normal feeding operation.

Another object of the invention is to provide article rejecting mechanism of the aforesaid character which is relatively simple and inexpensive in construction and highly efficient in operation.

Other objects will be apparent from a consideration of the following description taken in connection with the appended claims and annexed drawing in which the figure is a side elevational view partly in vertical section showing a preferred embodiment of the rejecting mechanism operatively associated with a conventional nut blank conveyor associated with a well known type of tapping machine known as the National Precision Tapper manufactured by the National Machinery Company of Tiffin, Ohio.

Referring to the drawing, a fragmentary portion T of a National Precision Tapper including the usual tap 9 and chute 10 is mounted in an inclined position for conveying an in line succession of drilled nut blanks 12 from a supply hopper or other source (not shown) to the holding jaws 11 of the tapping machine, the details of which are more fully described in United States patent to H. C. Tangowski, No. 2,356,100 dated August 15, 1944. Chute 10 comprises a bottom plate 14, side walls 16 and a top wall 18, defining an elongated passage of approximately square cross section adapted to convey nut blanks having a height substantially equal to the dimension across the flats.

Proper presentation of such blanks requires that the blanks be discharged into the jaws 11 with the axis of their bores parallel to the axis of jaws 11. This makes it necessary for the nut blanks to pass through chute 10 with the axis of their bores normal to bottom plate 14. If the blanks assume the position shown at 24 or 26, they will not be properly presented to the tap 9 and will jam the tapping machine causing damage to the machine and probably to the blank.

To avoid this danger the present invention provides an opening of a dimension to allow unobstructed ejection of a nut blank therethrough in top wall 18, an aligned apertured bracket 34 having flanges 35 abutting the bottom plate 14 and fastened thereto, as by screws 36, and a relatively small opening 50 in bottom plate 14 and concentric with opening 20 and bracket 34 for a purpose to be presently pointed out. The body 38 of bracket 34 extends perpendicularly outward of chute 10 and has fixedly fitted in the bore thereof one end portion of a cylinder 40. The inner open end of cylinder 40 is normally closed by a screw cap 42 provided with a central aperture 44 aligned with opening 50. Within the cylinder 40 is mounted a longitudinally reciprocating piston 46 having fixed thereto a plunger rod 48 disposed to move through the opening 44 and through the opening 50, in the bottom wall 14 of the chute. A spring 52 freely receives the plunger rod 48 and is compressed between piston 46 and cap 42 to yieldingly urge piston 46 toward an outer end wall 54 of cylinder 40.

In a position spaced from the cylinder 40 is an elongated, cylindrical vertically mounted valve housing 56 having its bore 58 opening through the bottom and terminating short of the top end thereof. Within the bore 58, between its ends, is formed a horizontal inwardly directed annular seat 60 having an under bevel against which is normally seated the beveled periphery of a valve disc 62. A stem 64 rises from disc 62 and slides in a guide bore 66, formed through the top wall of housing 56, and projects thereabove. At the upper end of stem 66 is mounted an apertured disc 68 between which and the top of housing 56 is mounted a spring 70 compressed to yieldingly hold the valve disc 62 tightly on its seat 60. In the bottom of bore 58 is fitted a reducer fitting 72 provided with a center bore adapted for connection with an air supply tube 74. Through one side of housing 56 is provided an internally threaded opening 76 communicating with the bore 58 at a point between valve seat 60 and the top thereof. A nipple 78 is threaded into bore 76 and, through a coupling sleeve 80 fitted thereon, connects one end of a tube 82 with the interior of the housing. A second interiorly threaded bore 84 in the wall of housing 56 has a constricted seat forming end communicating with the bore 58 above the valve and receives therein a threaded valve stem 86 having a knurled head 88 providing a needle valve for controlling the exhaust of air from the interior of housing 56. An arm 90 extended upwardly from one side of the top of housing 56 supports an obtuse angled cam lever 92 formed with an arcuate depending lobe 94 at the bottom bight portion of the lever. One end of the lever 92 is pivotally connected with the upper end of the arm 90 so that lobe 94 bears upon the upper end of valve stem 64. Above the valve mechanism a rotary spur gear 96 is mounted on a horizontal shaft 97 having its axis disposed to intersect the vertical axis through valve stem 64. On one face of gear 96 is carried an eccentrically positioned actuating roller 98 rotatably mounted on a pin 100 fixed to and projecting laterally from gear 96. Gear 96 meshes with and is driven by a spur pinion 102 mounted on a shaft 103 having driving connection with the gear mechanism (not shown) for operating the tapper. During each revolution of gear 96 roller 98 thereon contacts the elevated apex of cam lever 92 to effect predetermined depression of the lever and corresponding downward opening movement of valve 62 whereupon pressure fluid, in the present embodiment compressed air, is delivered to the cylinder 40 through the conducting tube 82. To this end, tube 82 connects with the end wall 54 of cylinder 40 through a nipple and sleeve connection indicated at 104.

The air delivered into cylinder 40 acts upon piston 46 to project the outer portion of plunger 48 transversely of the chute 10 through a length of stroke movement nearly equal to the transverse dimension of the chute passage. When roller 98 moves out of engagement with the cam lever, spring 70 functions to restore the valve 62 to its elevated closing position to cut off the air supply through line 74. At such time compression spring 52 functions to retract piston 46 toward end wall 54 of cylinder 40 and correspondingly retracts plunger rod 48 so that its outer end is withdrawn from the chute passage. During the interval between each step-by-step advancing movement of the line of nut blanks through the conveying passage, one of the blanks will assume a position in registry with the ejecting opening 20 of the chute. When, during the interval of rest, a properly positioned blank is in registry with the opening 20 the projected portion of plunger rod 48 executes its thrust and retracting movements through the bore of the blank and does not dislodge or disturb the blank. In the event an improperly positioned blank, such as the blanks 24 or 26, reaches rejectable placement in registration with the opening 20, the plunger, during its projecting thrust, will contact the exterior surface thereof and eject the blank from the chute through opening 20. In the latter event, the blank is projected against an arcuate deflecting member 106 and directed upon an endless conveyor belt 108 by which it is to be carried to the chute loading hopper. Since it is possible that a number of improperly positioned blanks may be disposed in immediately succeeding relation in the chute passage the valve actuating mechanism is designed to execute a multiplicity of strokes or reciprocating movements of plunger 48 during each rest interval of the blank feed, in the present instance sixteen strokes, in order to reject a corresponding number of improperly positioned blanks during such intervals. To this end, spur pinion 102 is arranged to make 32 revolutions during each rest interval and the gear ratio between gear 96 and pinion 102 is 2 to 1.

The rejecting mechanism is particularly adapted for conveyors feeding drilled nut blanks to tapping machines of the type employing cam actuated feed plungers which push the blank onto a rotary tap. It will be understood, however, that the rejecting mechanism is equally well suited for tappers employing a rotary holder for threading upon a stationary tap merely by driving pinion 102 from the holder drive mechanism in a suitable manner.

While pinion 102 is designed for connection with the tapper drive in such manner that it makes thirty-two revolutions during the interval between each advancing feed movement of the blanks, for example during the thrust movement and retraction of the feed plunger, and gear 96 is of a two to one ratio with relation to pinion 102 to effect sixteen strokes of plunger rod 48 in and out of the chute passage during the period of non-movement of the guided blanks, the mechanism may be made to reject a smaller or larger number of consecutive improperly positioned blanks during any such period merely by modifying the ratio between pinion 102 and gear 96. It will also be appreciated that plunger 48 is held in retracted position through the action of spring 52 to allow unimpeded advancement of the line of blanks through a feeding step and that upon retraction of piston 46 the air is forcibly exhausted through the valve regulated opening 84 in valve housing 56.

While the rejection mechanism just described is for all practical purposes foolproof, an added safety mechanism is provided to take care of improbable conditions, such as the presence of seventeen successive improperly positioned blanks. This mechanism comprises a bracket 128 connected to the chute 10 adjacent its discharge end and supporting a shaft 129 in a position spaced outwardly from and parallel with the bottom 14. Loosely journalled on shaft 129 is a spider 130 having a plurality of arms 131 radiating from the hub 132. The arms 131 rotate through a slot 133 in bottom 14 in a plane longitudinally of the chute and coincident with the axis of properly positioned blanks so as to successively project into the bores of such blanks without impeding their normal feed movement. The arms 131 are spaced circumferentially so that if an improperly positioned nut blank reaches slot 133 it will prevent rotation of the spider and jam the blanks in chute 10 to arrest movement of the following line until the improperly positioned blank is removed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Mechanism for conveying a line of apertured nut blanks to a tapper comprising a chute having an opening in a wall thereof, a cylinder attached to said chute with its bore coaxial with said opening, a reciprocatory plunger in said cylinder mounted so that its outer end is adapted to move transversely of said bore and in and out of said chute through said opening, means urging the plunger to a retracted position with its end outside of said chute, means for supplying compressed air to the cylinder to project said plunger end into said chute into the path of said nut blanks for ejecting blanks positioned in said chute with their apertures normal to the axis of said opening and said plunger, and means for controlling admission of air to said cylinder so as to effect ejecting operation of the plunger only during intervals when movement of said blanks along said chute is arrested.

2. An ejecting mechanism for use with chute conveyors for feeding articles having an open face to a finishing machine adapted to intermittently remove said articles from the discharge end of said conveyor and requiring presentation of said open faces in a predetermined position, comprising a cylinder mounted on said chute with its bore in axial alignment with an opening in said chute; a plunger reciprocable in said bore and having a stroke of sufficient length to project its free end through said chute opening into the path of movement of said articles along said conveyor; and means connected in timed relation to the removal means of said machine to effect reciprocation of said plunger only during the interval between the intermittent removal of articles at the discharge end of said chute whereby said plunger will repeatedly enter into the open face of a properly positioned article without disturbing its feeding movement but will forcefully strike a predetermined number of successively improperly positioned articles and eject them from said chute.

3. The combination defined in claim 2, together with means for receiving ejected articles and returning them to the chute conveyor at a point ahead of said ejecting mechanism whereby the ejected articles will be repeatedly supplied to said chute conveyor until they pass therealong in proper position.

4. The combination defined in claim 2, wherein said means connected in timed relation comprises a train of timing gears connected to the driving means of said machine and a control valve assembly interposed between said cylinder and a source of fluid under pressure and operable by said timing gears to alternately supply fluid pressure to said cylinder and exhaust fluid therefrom to effect reciprocation of said plunger.

5. The combination defined in claim 2, together with means operated by feeding movement of said articles for arresting movement of said articles upon contact with an improperly positioned article which may have passed said ejecting means due to the presence in said conveyor of a successive number of improperly positioned articles in excess of said predetermined number.

6. In combination with a nut tapping machine having a reciprocable feed plunger to intermittently supply unthreaded but drilled nut blanks to the tapping mechanism, a nut blank ejecting mechanism for selectively preventing improperly positioned drilled nut blanks from reaching said feed plunger comprising a chute conveyor having an opening in a wall thereof and arranged with its discharge end in operative relation to said feed plunger; a cylinder and piston assembly mounted on said chute and including a piston carried plunger normally resiliently retained in retracted position but arranged to pass through said opening into the path of movement of said nut blanks upon application of fluid pressure to said cylinder and piston assembly; and air pressure means for intermittently applying pressure to said cylinder and piston assembly in timed relation to reciprocation of said feed plunger to forcefully project said piston actuated plunger into said chute conveyor to eject nut blanks the drilled openings of which are not presented to said chute opening with their axes parallel to the axis of said chute opening.

7. The combination defined in claim 6, wherein said air pressure means comprises an air pressure line including a shut-off valve operable in timed relation to reciprocation of said feed plunger.

8. The combination defined in claim 6, together with a slot in said wall of said chute conveyor between said feed plunger and said ejecting mechanism and a spoke wheel mounted for rotation in a plane containing the longitudinal axis of said chute conveyor so that the spokes register with the drilled openings of properly positioned nuts but jam against the faces of improperly positioned nuts and arrest feeding movement of said nuts along said chute conveyor.

9. The combination defined in claim 6, together with timing gears driven from the driving mechanism of said feed plunger for controlling operation of said air pressure means.

GAIL C. ABBOTT.